United States Patent
Lauffenburger et al.

(10) Patent No.: US 6,657,961 B1
(45) Date of Patent: Dec. 2, 2003

(54) SYSTEM AND METHOD FOR ENHANCED END STATION TO END STATION DATA FLOW CONTROL

(75) Inventors: Kenneth A. Lauffenburger, Carrollton, TX (US); Klaus S. Fosmark, Plano, TX (US); William A. Perry, Jr., Addison, TX (US)

(73) Assignee: Efficient Networks, Inc., Dallas, TX (US)

( * ) Notice: Subject to any disclaimer, the term of this patent is extended or adjusted under 35 U.S.C. 154(b) by 0 days.

(21) Appl. No.: 09/135,995

(22) Filed: Aug. 18, 1998

(51) Int. Cl.[7] ............................................. H04L 12/26
(52) U.S. Cl. ................................... 370/231; 370/236.1
(58) Field of Search ................................ 370/229, 230, 370/230.1, 231, 232, 233, 234, 235, 236, 236.1, 236.2, 252, 253; 709/203, 224, 226, 232, 233, 234, 235; 710/29, 52, 60

(56) References Cited

U.S. PATENT DOCUMENTS

| | | | |
|---|---|---|---|
| 5,231,631 A | | 7/1993 | Buhrke et al. ................. 370/60 |
| 5,274,768 A | | 12/1993 | Traw et al. .................. 395/275 |
| 5,280,476 A | | 1/1994 | Kojima et al. ............... 370/60.1 |
| 5,311,509 A | | 5/1994 | Heddes et al. ............... 370/60 |
| 5,379,297 A | | 1/1995 | Glover et al. .............. 370/60.1 |
| 5,381,411 A | | 1/1995 | Ohno et al. ................... 370/60 |
| 5,414,707 A | | 5/1995 | Johnston et al. ............... 370/79 |
| 5,420,858 A | | 5/1995 | Marshall et al. ........... 370/60.1 |
| 5,430,721 A | | 7/1995 | Dumas et al. .............. 370/60.1 |
| 5,455,826 A | | 10/1995 | Ozveren et al. ............... 370/60 |
| 5,490,141 A | | 2/1996 | Lai et al. .................... 370/60.1 |
| 5,535,197 A | | 7/1996 | Cotton ......................... 370/60 |
| 5,548,587 A | | 8/1996 | Bailey et al. ............... 370/60.1 |
| 5,557,607 A | | 9/1996 | Holden ....................... 370/58.2 |
| 5,719,853 A | * | 2/1998 | Ikeda .......................... 370/229 |
| 5,864,539 A | * | 1/1999 | Yin ............................. 370/236 |
| 5,940,375 A | * | 8/1999 | Soumiya et al. ............. 370/249 |
| 6,005,843 A | * | 12/1999 | Kamiya ................... 370/236.1 |
| 6,463,036 B2 | * | 10/2002 | Nakamura et al. ....... 370/236.1 |

FOREIGN PATENT DOCUMENTS

| | | | |
|---|---|---|---|
| EP | 0130260 | 1/1985 | ............. H04L/5/14 |
| EP | 0325794 | 12/1988 | ........... H04Q/11/04 |
| WO | 9807282 | 4/1998 | |

OTHER PUBLICATIONS

"Universal Serial Bus Class Definition for Communication Devices," Version 1.1, *USB Implementers' Forum*, Jan. 19, 1999, 110 pages.

"ATM over ADSL Recommendations," *ADSL Forum Technical Report TR–002*, Mar. 1997, 23 pages.

"Framing and Encapulations Standards for ASDL: Packet Mode," *ASDL Forum WT–004 v3.0 Technical Report*, Mar. 1997, 16 pages.

Daniel Minoli and Michael Vitella, "ATM Cell Relay Service for Corporate Environments," *New York: McGraw–Hill, Inc.*, 1994.

"Traffic Managment Specification Version 4.0" (af–tm–0056.000), *The ATM Forum Technical Committee*, Apr. 1996, 108 pages.

* cited by examiner

Primary Examiner—Kwang Bin Yao
(74) Attorney, Agent, or Firm—Baker Botts L.L.P.

(57) ABSTRACT

A system and method for controlling data flow in an available bit rate asynchronous transfer mode ATM network. In the ATM network, a transmitting end station transmits data to a receiving end station across the network. The transmitting end station sends forward resource management (RM) cells across the network, while the receiving end station sends solicited or unsolicited backward RM cells across the network. The receiving end station contains a control module that generates and transmits an unsolicited RM cell having a desired low data flow rate to transmitting end station upon detecting congestion at the receiving end station. The control module also generates and transmits an unsolicited RM cell having a desired high data flow rate to the transmitting end station upon detecting absence of congestion at the receiving end station.

35 Claims, 2 Drawing Sheets

SYSTEM AND METHOD FOR ENHANCED END STATION TO END STATION DATA FLOW CONTROL

TECHNICAL FIELD OF THE INVENTION

The present invention relates generally to electronic devices, and more particularly, to a system and method for enhanced end station to end station data flow control in an available bit rate asynchronous transfer mode network.

BACKGROUND OF THE INVENTION

The development of the asynchronous transfer mode (ATM) method of transferring data and information across a network has created a need to provide traffic management services within these ATM networks. In networks that connect end station systems having very disparate performance speeds, a transmitting end station can often send data at a rate faster than a receiving end station can process the data. A low buffer condition can occur in the receiving end station that must be remedied. Traffic management services provide mechanisms to deal with flow rate problems such as this.

One such traffic management service is the ATM Forum Traffic Management Specification Version 4.0 (the TM 4.0 specification). The TM 4.0 specification is an ATM Forum Standard that uses existing explicit forward congestion indication (EFCI) switches. The TM 4.0 specification describes an Available Bit Rate (ABR) Protocol for controlling data flow that can adapt the data flow rate according to changing network conditions, including congestion at network end stations. The ATM Forum TM 4.0 specification was written specifically to address the problem of managing flow traffic within the network, rather than the problem of data congestion control at network end stations. However, the network is not always the point of congestion. A receiving end station may not be able to process the transmitted data at the rate the data is being sent, while the network is fully capable of transporting data at the transmitted rate.

While the TM 4.0 specification allows the receiving end station to send a message in a Resource Management Cell (RM cell) to indicate to the transmitting end station to stop sending data (sometimes called an "XOFF" message) as well as a message in an RM cell to restart data flow (sometimes called on "XON" message), the TM 4.0 specification has a relatively slow restart after an XOFF message has been processed. The TM 4.0 specification requires the receiving end station to either 1) wait for a forward RM cell from the transmitting end station or 2) wait one hundred milliseconds in order to send an XON signal after sending an XOFF signal. Thus, in the case where the receiving end station, and not the network, limits the data flow, the TM 4.0 specification does not provide an adequate mechanism to quickly remedy temporary end station receiver congestion such as a low buffer condition.

Several conventional network traffic management services provide data flow control with varying degrees of XOFF/XON effectiveness. QFC provides an ATM traffic management service with the ability to send messages indicating XON and XOFF conditions. However, QFC is not an ATM Forum Standard and does not work with existing deployed EFCI switches. QFC provides an ATM network traffic management service with some XON/XOFF capability. However, QFC only provides XON/XOFF capability from the network to the end station. Thus, a receiving end station cannot send a message indicating an XON or an XOFF to a remote transmitting end station. TCP is a traffic management system that can provide end station to end station flow control. However, TCP is not ATM network specific and is very slow reacting to congestion/dropped data at a receiving end station. DIGITAL EQUIPMENT CORPORATION's "FLOWMASTER" provides a proprietary traffic management service involving a mechanism where the receiver sends "credits" to the transmitter. When the transmitter uses up the credits, it must either get additional credits or stop transmitting. These conventional schemes do not, however, provide effective XOFF/XON functionality for ABR ATM networks.

SUMMARY OF THE INVENTION

The present invention provides an enhanced ABR ATM network end station to end station data flow control system and method that substantially eliminates or reduces disadvantages and problems associated with previously developed ABR ATM network data flow control systems and methods.

More specifically, the present invention provides a system and method for data flow control in an ABR ATM network. In the ABR ATM network, a transmitting end station transmits data to a receiving end station across the network. The transmitting end station sends forward resource management (RM) cells across the network, while the receiving end station sends backward RM cells across the network. The receiving end station contains a control module that can operate to stop or reduce data flow from the transmitting end station by sending an RM cell having a desired low data flow rate. The control module further operates to restart data flow to the receiving end station by sending a backward RM cell having a desired high data flow rate. In this way, the receiving end station has data flow control across the ATM network.

In a particular embodiment, a system for controlling data flow in an available bit rate asynchronous transfer mode network includes a transmitting end station that transmits data. A receiving end station receives the data transmitted by the transmitting end station and transmits a first unsolicited RM cell having a desired low data flow rate upon detecting congestion at the receiving end station. The receiving end station also transmits a second unsolicited RM cell having a desired high data flow rate upon detecting an absence of congestion at the receiving end station.

In a specific embodiment, the present invention provides a mechanism to allow a receiving end station to send XON and XOFF messages within a backward RM cell to a transmitting end station in an ATM network that is ATM Forum TM 4.0 ABR managed without waiting for a forward RM cell or for one hundred milliseconds to pass.

The present invention provides a technical advantage by enhancing end station to end station data flow traffic management in an ABR ATM network. The present invention allows a receiving end station to restart data flow at a rate set by the receiving end station. The present invention also allows the receiving end station to stop (or reduce) and restart data flow without waiting for the transmitting end station's forward RM cell. In a particular embodiment, the receiving end station generates unsolicited RM cells immediately upon detecting the congestion status at the receiving end station. As such, the present invention allows a receiving end station to stop or reduce data flow prior to a catastrophic overload that can cause data loss. This XON/XOFF capability is a technical advantage of the present invention.

The present invention provides another technical advantage by providing a standards-based data flow control system that works with existing EFCI switches.

Specifically, the present invention provides a technical advantage by interworking with other implementations of network switches and end stations that are fully compliant with the ATM Forum TM 4.0 specification. The present invention can use RM cells as defined in the TM 4.0 specification to provide the receiving end station with XON and XOFF capability without the slow start problems required under the existing TM 4.0 specification for an ABR protocol.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Figure 1:
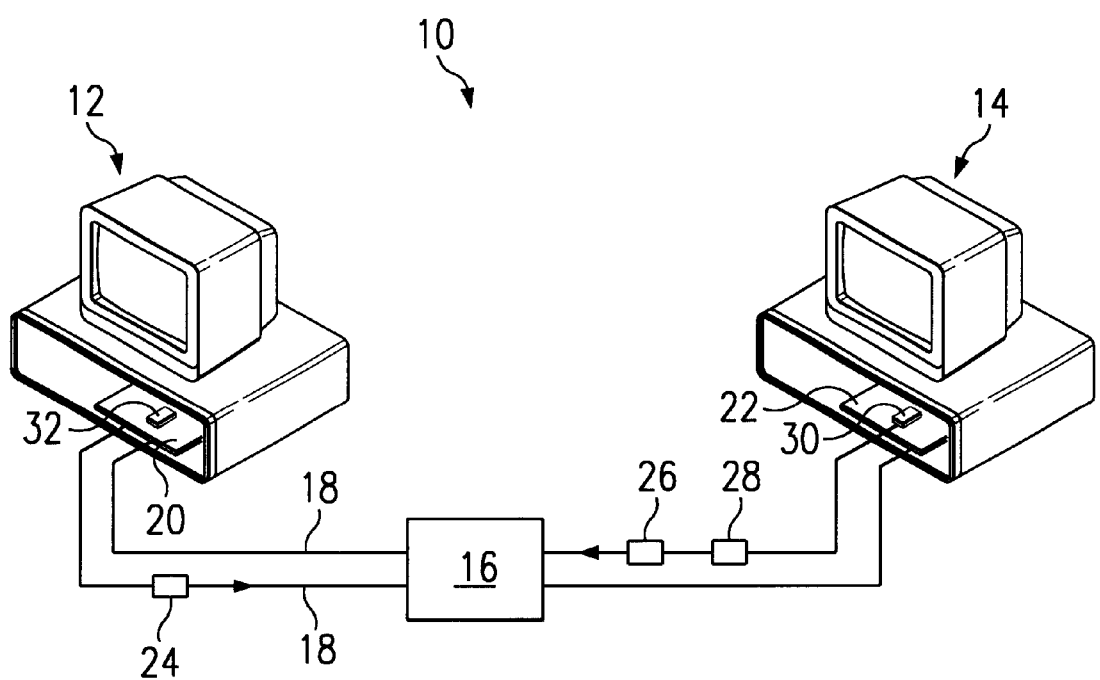
FIG. 1 is a diagram of an ATM network having one embodiment of end stations constructed according to the teachings of the present invention.

FIG. 1 is a diagram of an ATM network 10 having one embodiment of end stations constructed according to the teachings of the present invention. It should be understood that the ATM network shown in FIG. 1 is exemplary, and that the present invention can be implemented in and provide advantages to larger ATM networks having multiple end stations and switches. ATM network 10 shown in FIG. 1 includes a transmitting end station 12 having a network card 20 coupled to a network card 22 in receiving end station 14 via communication lines 18. The communication lines 18 connect each end station 12 and 14 to a network switch 16 between the two end stations 12 and 14. Network switch 16 can be a non-policing switch in an ABR ATM network operating under the TM 4.0 specification. Network cards 20 and 22 or other similar apparatus may reside in computers, edge devices (e.g., routers, bridges), or any other component of network 10.

Data flow packets exit from transmitting end station 12, through network card 20, through communication line 18 and into switch 16. The packets then flow from switch 16, through communication line 18, and to network card 22 in receiving end station 14. Data packets likewise flow from receiving end station 14 to transmitting end station 12. Network card 20 generates forward RM cell 24 that flows from transmitting end station 12 to network card 22 in receiving end station 14. Network card 22 contains control module 30 that can manipulate forward RM cell 24 prior to returning the cell back to transmitting end station 12 as a backward solicited RM cell 26. Control module 30 can also generate a backward unsolicited RM cell 28 that flows to transmitting end station 12. Information concerning data flow conditions in the network are conveyed between end stations 12 and 14 and other components of network 10 via RM cells 24, 26, and 28. In the ABR protocol, the TM 4.0 specification controls flow in a particular manner using the RM cells.

Network card 20 contains control module 32 that may perform similar functions as control module 30. In accordance with the TM 4.0 specification, control module 32 may receive RM cells from receiving end station 14 that indicate a desired change in the flow rate. In addition and in accordance with the present invention, control module 32 may also receive RM cells that specify a desired data flow rate, and in response, cause transmitting end station 12 to begin transmitting at the specified desired data flow rate. The control of the transmission rate of transmitting end station 12 based on a desired flow rate included in the RM cells from receiving end station 14 is an important technical advantage of the present invention.

Existing data flow control mechanisms for ABR ATM networks are network-centric. While these existing data flow traffic control mechanisms adequately address the problem of controlling data flow when the data flow rate overloads the network switches, they do not adequately address the problem that arises when the network has the capacity to handle the data flow rate, but a receiving end station has a temporary low receive buffer capacity condition, such that it cannot process the incoming data at that flow rate. Existing ABR flow control mechanisms do not have a receiver-controlled mechanism to allow the receiving end station to fully and efficiently regulate the data flow.

The available bit rate (ABR) protocol, as defined in the TM 4.0 specification, represents one protocol for transferring data over an ATM network. The ABR protocol in the TM 4.0 specification was designed to control data flow to avoid overloading the network switches. In the ABR scheme, the source manages data flow by adapting its data flow rate to changing network conditions, such as bandwidth availability and congestion. Information about the network conditions is conveyed to the source through the control cells called resource management cells (RM cells). The TM 4.0 specification defines the format and content of an RM cell. According to the teachings of the present invention, an RM cell can be formatted to signal a transmitting end station to start sending data (XON) or to stop sending data (XOFF) or reduce the rate of data. The TM 4.0 specification does not explicitly discuss the concept of XON/XOFF messages within an RM cell. However, when connection parameters are set appropriately both an XON and XOFF are possible by setting the value of the explicit rate (ER) value. For example, an ER value set to zero or a negotiated minimum cell rate (MCR) can signal an XOFF to a transmitting end station because the transmitting end station will respond by setting its transmission rate accordingly.

The present invention takes advantage of this XON/XOFF capability to allow receiving end station 14 to stop or reduce data flow and to restart data flow at a desired rate. The present invention provides this XON/XOFF capability using existing RM cells as defined within the TM 4.0 specification. In one embodiment, the present invention provides this end-station flow control using the existing frame formats as documented in the ABR ATM 4.0 specification. Specifically, control module 30 of network card 22 generates and transmits unsolicited RM cells 28 upon detecting congestion status at receiving end station 14. These unsolicited RM cells 28 can specify desired data flow rates and may be sent in time intervals not contemplated by the TM 4.0 specification to implement efficient XON/XOFF capability in network 10.

Figure 2:
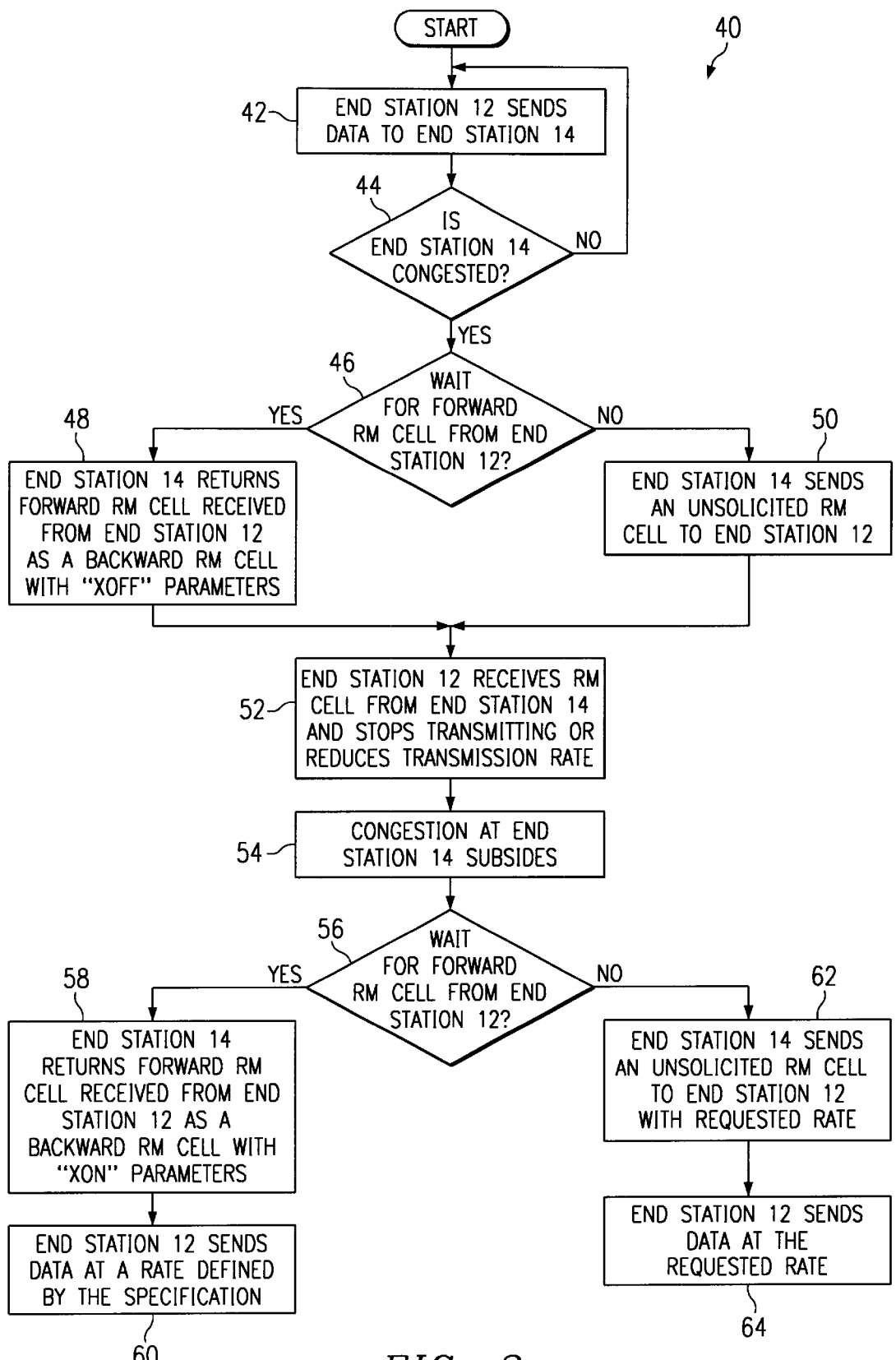
FIG. 2 is a flow diagram of one embodiment of a method for data flow control according to the teachings of the present invention.

FIG. 2 is a flow diagram of one embodiment of a method for data flow control according to the teachings of the present invention. Step 42 shows transmitting end station 12 sending data to receiving end station 14. In an ATM network, receiving end station 14 may not have the operating speed to receive data at the rate transmitting end station 12 sends data over network 10, resulting in a low buffer condition at receiving end station 14. The low buffer condition signals congestion in receiving end station 14. At step 44, if receiving end station 14 is not experiencing congestion, then no change is signaled, and transmitting end station 12 continues to send data at the same flow rate as shown in step 42. If receiving end station 14 is congested, receiving end station 14 can send a message to transmitting end station 12 in order to stop or reduce the data flow.

Receiving end station 14 can send an XOFF signal to transmitting end station 12 to stop or reduce the transmission of data to the receiving end station 14 in the event of a low buffer condition in two ways. The first way involves waiting for a forward RM cell from the transmitting end station 12 as shown by answering "YES" to the question posed in the decision tree of step 46. To signal an XOFF to stop or reduce the data flow as shown in step 48, a receiving end station 14 receives a forward RM cell from transmitting end station 12, sets the desired data flow rate (the "ER value") to zero or a negotiated minimum cell rate (MCR), and sends the manipulated, solicited RM cell 26 back to the transmitting end station 12. As shown in step 52, upon receiving the manipulated, solicited RM cell 26, the transmitting end station 12 will stop transmitting data to receiving end station or reduce the transmission rate.

A second way to stop or reduce data flow involves generating and sending an unsolicited RM cell 28 from the receiving end station 14 to the transmitting end station 12, as shown by answering "NO" to the question posed in the decision tree of step 46. As shown in step 50, rather than waiting for a forward RM cell from the transmitting end station 12, the control module of the receiving end station 14 can generate and send unsolicited RM cell 28 immediately upon detection of the congestion condition, in order to signal an XOFF to the transmitting end station 12. The control module sets the ER value equal to zero or a negotiated minimum cell rate (MCR), CI value equal to "1", and NI value equal to "0"(where CI is the "congestion indication" field, and NI is the "additive increase" field) within the unsolicited RM cell 28. Under the TM 4.0 specification, a CI value of "1" indicates congestion, while "0" indicates otherwise; an NI value of "1" indicates no additive increase in data flow rate, while "0" indicates otherwise. This unsolicited RM cell 28 generated and sent in step 50 represents an RM cell as defined by the TM 4.0 specification used to signal an XOFF to the transmitting end station 12.

Upon receiving solicited RM cell 26 or unsolicited RM cell 28 at step 52, transmitting end station 12 will set its data transmission rate accordingly. Control module 32 in transmitting end station 12 receives the desired flow rates specified in RM cells 26 or 28, and sets its transmission rate to the specified rate. It should be understood that the setting of the ER value is an operational choice that can be higher than zero (e.g., the MCR), but should be low enough to allow the receiving end station's low buffer condition to subside. By sending an XOFF signal in this manner, the present invention avoids the delay caused by waiting for a forward RM cell which could be as much as one hundred milliseconds delayed. The receiving end station's buffer could potentially fill up during the one hundred millisecond delay, resulting in a loss of data. When the applications are mapped to private virtual control channels, the mechanism of the present invention can "XOFF" the transmitting end station 12 application to ensure no data loss occurs.

The TM 4.0 specification for ABR provides an end station limited participation in the traffic flow management process. The participation is limited because, according to the TM 4.0 specification, an end station is only allowed to send backward RM cells at a rate of ten per second per connection, or an average of one cell every one hundred milliseconds per connection. Participation in data flow management is further limited as will be discussed in more detail below. In accordance with the present invention, a receiving end station 14 can send an unsolicited RM cell 28 to stop or reduce the flow of data in a low buffer or data congestion situation as soon as that condition is detected at the receiving end station.

As shown in step 54, the congestion at the receiving end station 14 will subside after the transmitting end station 12 stops sending data or reduces its transmission rate. Since the goal of network 10 is to transfer data, the next step is to restart data flow as soon as possible. Data flow can restart in two ways as shown by the decision tree in step 56. The transmitting end station 12 can attempt to restart data transmission by sending out RM cell 24 to the receiving end station 14 approximately every one hundred milliseconds. The forward RM cell can contain a request to increase the data flow rate. If the receiving end station 14 waits for forward RM cell 24 per the TM 4.0 specification, then in step 58 the receiving end station 14 receives the forward RM cell 24 and prepares to return it to the transmitting end station 12 as solicited RM cell 26. Depending on its congestion rate, the receiving end station 14 will either 1) set one or both of the CI and NI bits to "1", signaling continued XOFF, or 2) clear both CI and NI bits to "0" and set the desired ER value, signaling XON. If an XOFF is signaled, the transmitting end station 12 will not restart data flow. As shown in step 60, if the backward RM cell returned to the transmitting end in step 58 signals an XON, the transmitting end station 12 will restart data flow rate at a flow rate defined by the ABR protocol. Under the TM 4.0 specification, a receiving end station 14 must wait (up to one hundred milliseconds) for forward RM cell 24 in order to signal an XON to the transmitting end station 12 using solicited RM cell 26. This slow restart process introduces unnecessary delay.

As described, the TM 4.0 specification provides receiving end stations with limited control over data flow. The TM 4.0 specification does not give a receiving end station 14 the ability to dictate specific flow rates, but rather only allows a receiving end station 14 to signal that it would like the current data transmit rate to decrease below a specific value or at least not increase, or to request that the data transmit rate increase to a specific value. The TM 4.0 specification further limits the receiving end station's ability to control data flow by imposing implied delay restrictions on the transmission of RM cells 26 or 28, and by disallowing a receiving end station 14 from requesting a rate increase using an unsolicited RM cell 28, thereby forcing it to wait for forward RM cell 24 from the transmitting end station 12. This causes unnecessary restart delays because the transmitting end station 12 must limit the rate at which it transmits RM cells 26 or 28 to ten cells per second maximum (one cell per one hundred milliseconds) during an XOFF condition.

The present invention uses the existing backward RM cell structure in a way not contemplated by the TM 4.0 specification to provide faster XON capability to restart data flow at a desired data flow rate that can exceed the ramp-up rate defined in the specification. As shown in step 62 of FIG. 2, if the answer to the question posed in step 56 is "NO", the receiving end station, rather than waiting for forward RM cell 24, can use control module 30 in network card 22 to generate and send an unsolicited RM cell 28 with an ER value equal to a desired flow rate, CI=0, NI=0. This represents a novel use of an RM cell format supported by the TM 4.0 specification to signal an XON to the transmitting end station 12. By sending the XON backward RM cell immediately upon detecting an absence of congestion in step 62, the present invention can avoid unnecessary delays.

Setting the desired data flow rate to a non-zero value in step 62 signals an XON and can restart transmission of data to that data flow rate. According to the present invention, the control module can set the desired data flow rate to any non-zero value to restart data flow. In step 64, the transmitting end station 12 will then restart data flow at the rate requested by the receiving end station. Steps 56, 62, and 64 illustrate end station data flow rate control according to the present invention using unsolicited RM cell 28.

In one embodiment, control module 30 of FIG. 1 (or alternative circuit) of the present invention can record the data flow rate that existed at the point the XOFF message was sent. Control module 30 can then set the ER value to request data flow at the rate data had been flowing prior to detecting congestion at receiving end station 14. This tracking and setting of the ER value back to the original flow rate assumes that if network 10 granted the previous rate of data flow, network 10 can still handle that rate. The present invention can set the desired data flow rate back to the rate prior to the XOFF by setting the ER value to the ER value contained in the last forward RM cell 24 sent from the transmitting end station 12 prior to the XOFF signal.

By setting the desired data flow rate in unsolicited RM cell 28, the present invention provides enhanced data flow management by avoiding the delay caused by a slow ramp up to previous data flow rates. The present invention provides a further technical advantage by sending a backward XON signal without waiting up to one hundred milliseconds for a forward RM cell to arrive.

The present invention provides another technical advantage because if unsolicited RM cell 28 is dropped or lost in network 10, the normal slow restart mechanism built into the TM 4.0 specification will take over and restart data flow. Thus, the TM 4.0 specification data flow restart acts as a backup to the faster data flow restart mechanism of the present invention.

The present invention can be implemented in receiving end station 14 with no modifications to the remainder of an ABR ATM network 10. For example, a receiving end station 14 with control module 30 can connect over network 10 to a transmitting end station 12 that is blind to the present invention. Because the present invention can use existing RM cells as defined with the TM 4.0 specification, receiving end station 14 can provide near instantaneous flow control due to detected congestion. Furthermore, transmitting end station 12 equipped with control module 32 may receive an unsolicited RM cell 28, set the transmission data rate equal to the ER rate specified in unsolicited RM cell 28, and start sending data at the desired data flow rate.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for controlling data flow in an available bit rate asynchronous transfer mode network, comprising:

a receiving end station comprising an ultimate destination for data communicated to the receiving end station from a transmitting end station;

wherein the receiving end station is operable to transmit a first unsolicited RM cell having a desired low data flow rate in response to detecting a congestion occurring at the receiving end station; and wherein the receiving end station is further operable to transmit a second unsolicited RM cell having a desired high data flow rate in response to detecting a reduction of the congestion occurring at the receiving end station.

2. The system of claim 1, wherein congestion comprises a low buffer condition at the receiving end station.

3. The system of claim 1, wherein:

the receiving end station transmits the first unsolicited RM cell immediately upon detecting the low buffer condition; and the receiving end station transmits the second unsolicited RM cell immediately upon detecting the absence of the low buffer condition.

4. The system of claim 1, further comprising at least one network switch coupled to the transmitting end station and the receiving end station.

5. The system of claim 1, wherein the desired low data flow rate comprises approximately zero.

6. The system of claim 1, wherein the desired low data flow rate comprises a negotiated minimum cell rate greater than zero.

7. The system of claim 1, wherein:

the transmitting end station comprises an edge device for transmitting data over the network; and the receiving end station further comprises a computer with a network card containing the control module.

8. The system of claim 1, wherein the first unsolicited RM cell comprises a backward RM cell generated and transmitted by the receiving end station.

9. The system of claim 1, wherein the second unsolicited RM cell comprises a backward RM cell generated and transmitted by the receiving end station within one hundred milliseconds of transmitting the first unsolicited RM cell.

10. The system of claim 1, wherein the desired high data flow rate in the second unsolicited RM cell comprises the data flow rate contained within a most recent RM cell received at the receiving end station.

11. The system of claim 1, wherein the transmitting end station transmits data at the desired high data flow rate immediately upon receiving the second unsolicited RM cell.

12. An available bit rate asynchronous transfer mode apparatus, comprising:

an interface for connecting to a network; and a control module, the control module operable to generate a first unsolicited RM cell having a desired low data flow rate in response to detecting a congestion occurring at a receiving end station, the receiving end station comprising an ultimate destination for data communicated to the receiving end station from a transmitting end station, the control module further operable to generate a second unsolicited RM cell having a desired high data flow rate in response to detecting a reduction of the congestion occurring at the receiving end station.

13. The apparatus of claim 12, wherein congestion comprises a low buffer condition at the receiving end station.

14. The apparatus of claim 12, wherein:

the control module generates the first unsolicited RM cell immediately upon detecting the low buffer condition; and the control module generates the second unsolicited RM cell immediately upon detecting the absence of the low buffer condition.

15. The apparatus of claim 12, wherein the desired low data flow rate comprises approximately zero.

16. The apparatus of claim 12, wherein the desired low data flow rate comprises a minimum cell rate greater than zero.

17. The apparatus of claim 12, wherein:
the transmitting end station comprises an edge device for transmitting data over the network; and
the receiving end station further comprises a computer with a network card containing the control module.

18. The apparatus of claim 12, wherein the first unsolicited RM cell comprises a backward RM cell generated and transmitted by the receiving end station.

19. The apparatus of claim 12, wherein the second unsolicited RM cell comprises a backward RM cell generated and transmitted by the receiving end station within one hundred milliseconds of transmitting the first unsolicited RM cell.

20. The apparatus of claim 12, wherein the desired high data flow rate in the second unsolicited RM cell comprises the data flow rate contained within a most recent RM cell received at the receiving end station.

21. The apparatus of claim 12, wherein the apparatus resides in an edge device.

22. The apparatus of claim 12, wherein the control module is further operable to cause transmission of data at a data flow rate specified in an RM cell received at the apparatus.

23. A method for data flow control in an available bit rate asynchronous transfer mode network having a transmitting end station and a receiving end station, comprising:
detecting a low buffer condition at a receiving end station, the receiving end station comprising an ultimate destination for data communicated to the receiving end station from a transmitting end station;
transmitting a first unsolicited RM cell having a desired low data flow rate in response to detecting the low buffer condition;
detecting a reduction of the low buffer condition at the receiving end station; and
transmitting a second unsolicited RM cell having a desired high data flow rate in response to detecting the reduction of the low buffer condition.

24. The method of claim 23, wherein:
transmitting a first unsolicited RM cell comprises transmitting a first unsolicited RM cell immediately upon detecting the low buffer condition; and
transmitting a second unsolicited RM cell comprises transmitting a second unsolicited RM cell immediately upon detecting the absence of the low buffer condition.

25. The method of claim 23, wherein receiving data from the transmitting end station comprises receiving data from at least one network switch coupled to the transmitting end station and the receiving end station.

26. The method of claim 23, wherein the desired low data flow rate comprises approximately zero.

27. The method of claim 23, wherein the desired low data flow rate comprises a negotiated minimum cell rate greater than zero.

28. The method of claim 23, wherein:
the transmitting end station comprises an edge device for transmitting data over the network; and
the receiving end station further comprises a computer with a network card containing the control module.

29. The method of claim 23, wherein the first unsolicited RM cell comprises a backward RM cell generated and transmitted by the receiving end station.

30. The method of claim 23, wherein the second unsolicited RM cell comprises a backward RM cell generated and transmitted by the receiving end station within one hundred milliseconds of transmitting the first unsolicited RM cell.

31. The method of claim 23, wherein the desired high data flow rate in the second unsolicited RM cell comprises the data flow rate contained within a most recent RM cell received at the receiving end station.

32. The method of claim 23, wherein transmitting a first unsolicited RM cell having a desired low data flow rate comprises signaling an XOFF to the transmitting end station.

33. The method of claim 23, wherein transmitting a second unsolicited RM cell having a desired high data flow rate comprises signaling an XON to the transmitting end station.

34. A system for controlling data flow in an available bit rate asynchronous transfer mode network comprising a receiving end station, the receiving end station operable to:
transmit a first unsolicited RM cell having a desired low data flow rate in response to detecting a congestion occurring at the receiving end station, the receiving end station comprising an ultimate destination for data communicated to the receiving end station from a transmitting end station; and
transmit a second unsolicited RM cell having a desired high data flow rate in response to detecting a reduction of the congestion occurring at the receiving end station.

35. A method for data flow control in an available bit rate asynchronous transfer mode network, comprising:
communicating data from a transmitting end station to a receiving end station, the receiving end station comprising an ultimate destination for the data communicated by the transmitting end station;
receiving a first unsolicited RM cell having a desired low data flow rate from the receiving end station, the first unsolicited RM cell received in response to a low buffer condition at the receiving end station; and
receiving a second unsolicited RM cell having a desired high data flow rate from the receiving end station, the second unsolicited RM cell received in response to a reduction of the low buffer condition at the receiving end station.

* * * * *